(12) United States Patent
Hauer et al.

(10) Patent No.: US 6,635,848 B2
(45) Date of Patent: Oct. 21, 2003

(54) METHOD AND DEVICE FOR CUTTING FLAT WORK PIECES OF A BRITTLE MATERIAL

(75) Inventors: Dirk Hauer, Heidenheim (DE); Berndt Hoetzel, Woerrstadt (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 10/130,522

(22) PCT Filed: Dec. 7, 2000

(86) PCT No.: PCT/EP00/12331
§ 371 (c)(1),
(2), (4) Date: May 2, 2002

(87) PCT Pub. No.: WO01/42152
PCT Pub. Date: Jun. 14, 2001

(65) Prior Publication Data
US 2002/0170895 A1 Nov. 21, 2002

(30) Foreign Application Priority Data
Dec. 11, 1999 (DE) .......................... 199 59 921

(51) Int. Cl.[7] .............................................. B23K 26/38
(52) U.S. Cl. ................................................. 219/121.72
(58) Field of Search ........................ 219/121.72, 121.6, 219/121.67, 121.68, 121.69, 121.73, 121.74, 121.75, 121.79, 121.8, 121.81, 121.83; 156/272.8; 264/400

(56) References Cited

U.S. PATENT DOCUMENTS 6,130,401 A * 10/2000 Yoo et al.
6,548,781 B1 * 4/2003 Brunwinkel

FOREIGN PATENT DOCUMENTS

| DE | 43 05 107 A1 | 8/1994 |
| DE | 693 04 194 | 1/1997 |
| EP | 0 872 303 A2 | 10/1998 |
| WO | 93 20015 A | 10/1993 |

* cited by examiner

Primary Examiner—Tom Dunn
Assistant Examiner—Jonathan Johnson
(74) Attorney, Agent, or Firm—Michael J. Striker

(57) ABSTRACT

The method of making a freeform cut on a work piece made of brittle material, such as glass, includes producing a linear focal point from a laser beam and a cold spot following the linear focal point on the work piece so that at least 60 percent of a laser beam energy output is concentrated at opposite ends of the linear focal point; moving the linear focal point along a specified contour for forming the cut and adjusting a length of the focal point according to a contour line curvature, so that the opposite ends lie on the contour, even when the contour is curved, in order to make the freeform cut. The device for performing this method includes a numerical trajectory control device (4) for positioning the linear focal point as it moves along the contour and a profile control device (3) cooperating with the numerical trajectory control device (4) for controlling a length (S) of the linear focal point (1).

6 Claims, 2 Drawing Sheets

METHOD AND DEVICE FOR CUTTING FLAT WORK PIECES OF A BRITTLE MATERIAL

BACKGROUND OF THE INVENTION

The invention is based on a method for cutting flat work pieces made of a brittle material, in particular glass or ceramic, in which a laser beam having a linear beam profile followed by a cold spot is moved along a dividing line having a specified contour. A preferred application of the method is in the cutting of flat glasses.

The invention is based further on a device for cutting a work piece of this type using a laser beam in the form of a linear beam profile followed by a cold spot.

Conventional methods for cutting flat glasses are based on the use of a diamond or a small rotary cutter to first produce a scribed line in the glass in order to then break the glass by application of an external mechanical force along the weak point produced in this fashion ("laser scribe and break"). The disadvantage of this method is that the scribed line causes particles (fragments) to be released from the surface, which said particles can deposit on the glass and scratch it, for example. Additionally, "chips" can be created in the cut edge, which results in an uneven glass edge. Furthermore, the micro-cracks produced in the cut edge during the scribing process lead to reduced mechanical stressability, i.e., to increased risk of breakage.

An approach for preventing the formation of fragments as well as chips and micro-cracks is to cut glass based on thermally induced mechanical tension. In this approach, a heat source directed at the glass is moved at a fixed speed relative to the glass, thereby producing such a high thermal mechanical tension that cracks form in the glass. Infrared emitters, special gas burners and lasers, in particular, possess the necessary property of the heat source to position the thermal energy locally, i.e., with an accuracy of greater than one millimeter, which corresponds to typical cutting accuracies. Lasers have proven to be effective and have gained acceptance due to their good focusability, good controllability of output, and the ability to shape the beam and, therefore, to distribute intensity on glass. As a result, the glass can first be scribed using the laser beam and then broken mechanically. Or, the glass can be separated directly using the beam in conjunction with a mechanically-applied starting fissure, i.e., it can be cut. The terms "separate/divide" or "cut" are intended to encompass the term "scribe-break" as well as "cut".

This laser beam separating method—which induces a thermal mechanical tension up to above the breaking strength of the material by means of local heating using the focused laser beam in conjunction with cooling applied from the outside—has been made known in numerous publications, e.g., in EP 0 872 303 A 2.

The laser beam separating methods mentioned hereinabove differ in particular by the configuration of the focal point. The method according to DE 693 04 194 T 2, for example, uses a laser beam having an elliptical cross section followed by a cold spot.

The publication EP 0 872 303 A 2 cited hereinabove describes a laser beam separating method that provides a focal point having a U-shaped or V-shaped contour that opens in the direction of separation. Contours derived from these, such as X-shaped focal points, are also described. In both cases, the laser beam focal points have a two-dimensional structure that has proven effective in accomplishing straight cuts. When making freeform cuts, a curved, two-dimensional focal point adapted to the contour of the dividing line would have to be produced and moved along the contour, including the cooling that follows it. This would require, in particular, coupling the scanner device producing the respective two-dimensional focal point plus the cold spot device to a trajectory control device, the realization of which is very problematic due to the large quantities of data to be exchanged and the cutting speeds required.

A laser beam separating method has been made known in DE 43 05 107 C 2 in which the laser beam is shaped in such a fashion that its beam cross-section has a linear shape on the surface of the work piece, and in which the ratio of length and width of the impinging beam cross-section can be adjusted using an aperture in the laser beam path. This method is greatly restricted as well in terms of its usability. It cannot be used to make freeform cuts and, because the cooling is not to be applied until after the dividing line has been heated completely, e.g., using a jet of cold compressed air, the known method is suited practically only for use as described to cut off the extruded rim of hollow glassware, in which method the hollow glassware rotates in the stationary laser beam, whereby the rim is first heated all the way around its circumference by means of the laser beam and then cooled in supportive fashion by blowing off the gas.

SUMMARY OF THE INVENTION

The invention is based on the object of carrying out the method described initially in such a fashion, and of designing the associated device in such a fashion that freeform cuts can be accomplished relatively easily using the laser beam separating method.

Based on the method for cutting flat work pieces made of a brittle material, in which a laser beam having a linear beam profile followed by cold spot is moved along a dividing line having a specified contour, the object is attained according to the method by the fact that, to make freeform cuts, a linear focal point having significant intensity increases at both ends is produced on the work piece, in which said method at least 60% of the beam output is concentrated at the ends of the linear focal point, and which said focal point is moved along the dividing line in such a fashion that, even when the dividing line is curved, the two ends lie on the dividing line, and the length of said linear focal point is adjusted as a function of the curvature of the contour of the dividing line.

As a result of these measures, it is possible to accomplish freeform cuts having any shape using a relatively simple method, because the greater part of the energy is concentrated in the ends of the focal point, and this said energy is confined to the dividing line while the length of the focal point is adapted to the curvature of the contour, so that, when small radii of curvature are involved, the length of the focal point is correspondingly short and, when large radii are involved, the length of the focal point is correspondingly long, in order to ensure the necessary application of energy to the dividing line.

To prevent the work piece material from melting, the method is carried out according to one embodiment of the invention in such a fashion that the laser output is adjusted as a function of the length of the linear focal point.

The method can be carried out relatively easily and advantageously according to another embodiment when the linear focal point is produced by scanning the laser beam.

With regard for the device for carrying out the method according to the invention, the object is attained by the fact that an optical system for producing a linear focal point having significant intensity increases at both ends—in which said ends at least 60% of the beam output is concentrated—is provided, which said optical system is coupled to a numerical trajectory control device via a profile control device in such a fashion that, even when the dividing lines are curved, both ends of the linear focal point are positioned on the dividing line of the freeform cut, and the length of the focal point is adjusted as a function of the curvature of the contour of the dividing line.

Due to the linear focal point, the optical system can be designed relatively simple in nature, and conventional trajectory control devices can be used to move the ends of the focal point on the dividing line and adjust the length of the focal point to the contour of the dividing line.

An optimal separation is ensured when, according to one embodiment of the invention, further axes coupled to the trajectory control device are provided to position the cold spot in relation to the linear focal point and the work piece.

According to a further embodiment of the invention, the device can be designed particularly simple in nature when the optical system comprises a scanner having an oscillating mirror. To change the length of the linear focal point, one only need to change the oscillation amplitude of the oscillating mirror so that the profile control device and the trajectory control device can be designed relatively simple in nature.

Further features and advantages of the invention result from the description of an exemplary embodiment shown in the drawing.

BRIEF DESCRIPTION OF THE SEVERAL VIEWS OF THE DRAWING

The basic principles of the method according to the invention for cutting a flat work piece made of a brittle material, in particular flat glass, are shown in FIGS. 1 and 2. FIG. 1 shows the principle layout of the controller of the sequences of motions along a dividing or cutting line having a specified contour. FIG. 2 shows the focal point geometry of the laser beam with the cold spot following it, and the matching of the axes of motion of the contour control device according to FIG. 1.

The cutting principle according to the invention is based on a linear focal point 1 having two ends 1a and 1b. Respective intensity maxima are located at these two ends 1a, 1b. Due to these intensity maxima at the ends of the linear focal point, approximately 80% of the total applied thermal energy of the laser beam is located there. This thermal energy is used to produce the thermal mechanical stress field. That means that only approximately 20% of the energy is located off the specified contour for the cutting line next to it.

As a result, it is possible, when the dividing lines are curved, to keep the linear focal point 1 in the shape of a line when the endpoints of the line 1 are guided along the dividing line 2—while adjusting the length of the line S to the radius of curvature—so that the main application of energy takes place on the dividing line, and a clean cut along the dividing line is made possible. If the dividing line is linear, the line can be relatively long. The smaller the radius of curvature is, the shorter the line 1 must be, so that the main application of energy takes place on the dividing line. The line length varies hereby between 10 mm and 100 mm. In parallel with changing the length of the line, the laser output is regulated suitably downward when short lines are involved, and it is regulated upward when long lines are involved.

DETAILED DESCRIPTION OF THE INVENTION

To produce the linear focal point 1, a known laser-beam scanner, e.g., according to the FIG. 5 of the publication EP 0 872 303 A2 cited initially, is preferably used. However one of the two deflection mirrors can be eliminated from this laser-beam scanner, however, because scanning need only take place in one axial direction—because one axis of deflection is sufficient to produce a line. This means that engineering expenses are advantageously reduced.

A scanning procedure can be used as well that uses a rotating mirror having simple, flat mirror surfaces according to FIG.6 of the aforementioned EP publication and a corresponding, preferably sinusoidal speed curve (polygonal wheel).

When the laser beam is scanned using oscillating mirrors or polygonal wheels having a sinusoidal speed curve, the laser beam spends more time at the reversal points of the scanner motion on the work piece to be separated than it does in the region therebetween, i.e., when the linear focal point 1 is produced by means of scanning, an intensity increase typically occurs at the end points of the line 1.

Figure 1:
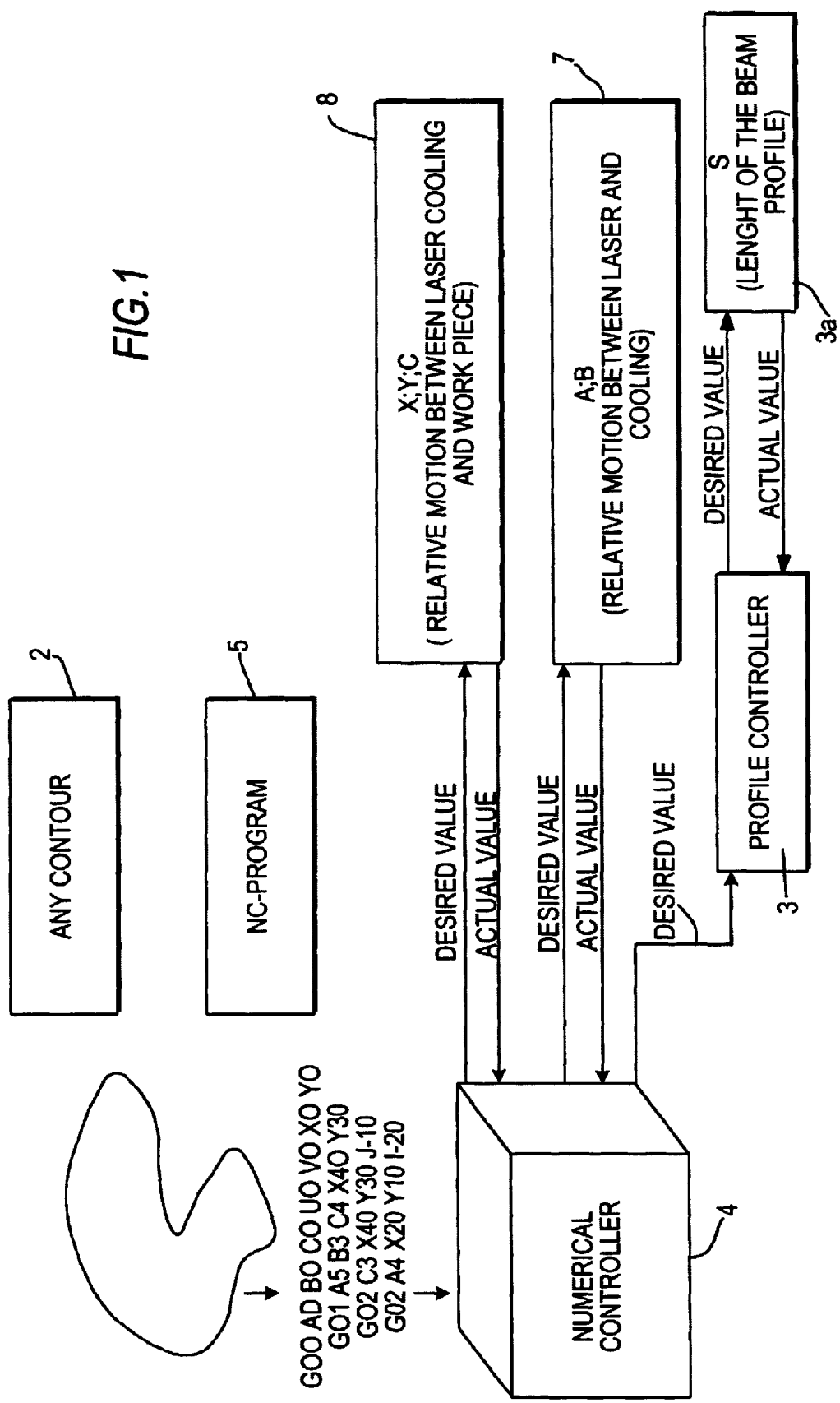
FIG. 1 shows a schematic block diagram of the basic layout of the contour controller of the device according to the invention.
Figure 2:
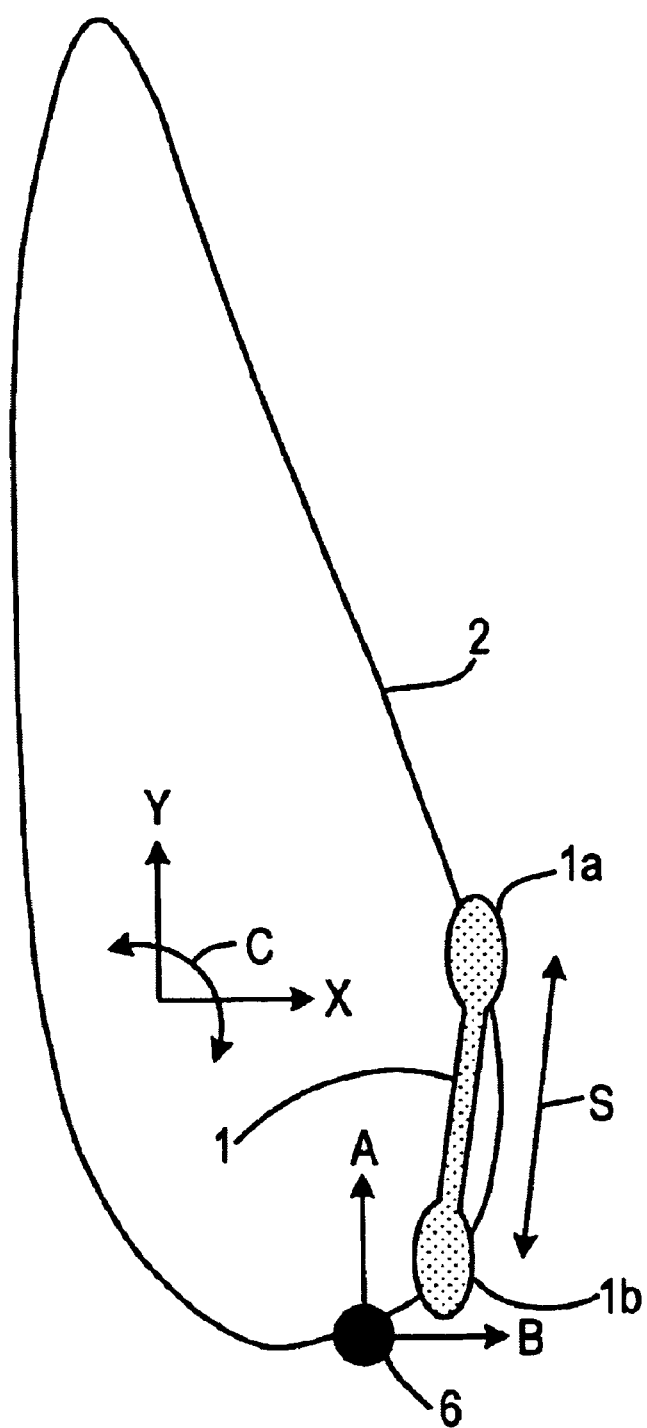
FIG. 2 shows a schematic, diagram-like illustration of the shape of the focal point and the cold spot, as well as the associated axes of motion to be worked by the contour control device.

In the typical scanning process using oscillating mirrors, said oscillating mirrors have an oscillation frequency of 400 Hz and higher, whereby the oscillation amplitude of the oscillating mirrors determines the line length 2 in FIG. 1. The scanner is controlled by means of a profile control device 3 shown in FIG. 1. This control receives—from a numerical control device—the desired value for the length S of the focal point 1 required at the respective point of the dividing line 2. The profile control device now drives an oscillator motor 3a of the oscillating mirror in such a fashion that it executes the appropriate oscillation for the required length S of the profile. In this process, the profile control device 3 generates an analog voltage fluctuation as the desired value, which said desired value is converted directly by the oscillator motor into an oscillating motion. The desired value—which is forwarded by the numerical control device 4 to the profile control device 3—is transmitted either in the form of an analog constant voltage signal, e.g., 0–10 V, whereby the length S is proportional to the voltage, or in the form of a digital value with a resolution of at least 8 bits. The actual value feedback by the measuring system of the oscillator motor 3a shown in the illustration can be eliminated if a calibration curve for the oscillator motor is stored in the profile control device 3 or the numerical control device 4.

To ensure that the end points of the focal line 1 lie on the desired dividing line 2, the numerical control device 4 controls the NC axes 8 (X, Y and C) and the profile length S via transmission of the desired value to the profile control device 3 according to a known NC program 5 and associated interpolation algorithms stored in the numerical control device. Using the information about the profile length S, the position and speeds of the axes X, Y and C, and the shape of the dividing line 2 described by an NC program 5, the numerical control device is capable of guiding the end points 1a and 1b of the focal line 1 in such a fashion that they follow the dividing line with a maximum deviation of typically less than 0.2 mm. The dividing line is followed that much more exactly the faster the numerical control device is capable of generating new desired values for the axes 8 and the profile control device 3, and the faster these said desired values can be implemented by the axes 8 and the oscillator motor 3a. According to the current status of control technology, typical values for the application are approximately 3 ms.

The width of the focal line 1 is specified by the diameter of the focused laser beam on the work piece surface. The diameter on the work piece surface is typically between 0.3 mm and many millimeters. Optical elements are used to focus the laser beam. In selecting the optical elements and the laser, the objective is to distribute the intensity along the line between the end points 1a and 1b as evenly as possible without any local intensity peaks, and to keep the maximum intensity in the end points as low as possible. In this manner, the greater part of the laser energy can be injected into the work piece without exceeding the glass softening temperature. For this purpose, focusing elements having long focal length of approximately 300 mm and above, top-hat lenses, axicons or lasers having a ring mode or multi-mode can be used. The width of the line depends thereby on the required laser output, cooling, material type, material thickness and feed rate.

To increase the thermal mechanical tension, cooling is carried out subsequently in known fashion using a cold spot 6 at a defined distance behind the laser profile, i.e., the focal line 1, on the contour 2 to be cut. This cold spot 6 is produced, for example, by means of a cold jet of air or a gas/liquid mixture injected via a nozzle.

Due to the high temperature in the work piece produced by the laser beam, a high thermal mechanical tension is created along the contour to be cut in the work piece. When cooling is applied subsequently and the glass is weakened in advance at the starting point of the cut/fissure, the glass cracks along the contour described by the cooling nozzle and the "beam line".

Due to the heating of the work piece achieved along the contour to be cut and the cooling carried out following it on the contour at a defining distance of between approximately 2 mm and 15 mm, the cut follows any possible free form very precisely. In this fashion, any possible geometry can be cut in thin glass (approx. 50 μm), as well as thick glass (many millimeters), or scribing can be carried out at a depth of up to many tenths of millimeters.

The advantage of cutting lies in the fact that subsequent breaking is not required, which eliminates a finishing step. The advantage of scribing lies in the fact that, at much higher speeds (up to 1000 mm/s), the material was separated nearly fragment-free even after breaking and, due to the lack of micro-cracks and chips, a markedly higher edge rigidity is obtained. In order to achieve this, the cooling, i.e., the position of the cold spot 6 relative to the focal line 1, must also be adjusted very precisely.

The axes 7 (A and B), which are responsible for the trailing guidance of the cooling nozzle along the dividing line 2, are also connected to the numerical control device 4. The axes A and B also interpolate with the axes X, Y, C and the axis specified by the oscillator motor 3a.

The object of the axes A and B is to maintain a constant distance between the cold spot 6 and the starting point 1b of the focal line 1. The profile control device 3 can hereby be designed so that the lowest voltage value of the fluctuating voltage for the oscillator of the oscillating mirror always remains constant. This ensures that the point 1b is stationary. The axes 7A and B therefore need only cover short distances.

"Axes" in the context of the invention should be understood to mean not only the geometric axes, but also the associated moving members, such as actuators and the like, that specify the axes.

What is claimed is:

1. A method of making a freeform cut on a work piece, said work piece being made of brittle material, said method comprising the steps of:
    a) producing a linear focal point from a laser beam and a cold spot following the linear focal point on the work piece so that at least 60 percent of a laser beam energy output is concentrated at opposite ends of said linear focal point;
    b) moving said linear focal point along a dividing line having a predetermined contour; and
    c) adjusting a length of said focal point according to a curvature of the dividing line, so that said opposite ends lie on the dividing line even when the dividing line is curved, in order to make the freeform cut.

2. The method as defined in claim 1, wherein 80 percent of said laser beam energy output is concentrated at said opposite ends of said linear focal point.

3. The method as defined in claim 1, further comprising adjusting said laser beam energy output according to said length of said linear focal point.

4. A device making a freeform cut on a work piece made of brittle material, said device comprising
    an optical system including a laser beam scanner and a laser beam focusing device for producing a linear focal point (1) on the work piece from a laser beam so that said linear focal point has at least 60 percent of a laser beam energy output of the laser beam concentrated at opposite ends (1a, 1b) of said linear focal point;
    a numerical trajectory control device (4) for controlling a position of the linear focal point (1) so that the linear focal point (1) moves along a dividing line having a predetermined contour; and
    a profile control device (3) cooperating with the numerical trajectory control device (4) for controlling a length (S) of the linear focal point (1) with a predetermined length, so that said opposite ends of said linear focal point lie on the dividing line, even when the dividing line is curved, in order to make the freeform cut.

5. The device as defined in claim 4, further comprising means for positioning a cold spot (6) in relation to the linear focal point (1) and the work piece.

6. The device as defined in claim 4, wherein the laser beam scanner comprises an oscillating mirror for scanning said laser beam.

* * * * *